Feb. 14, 1939. O. W. LEE 2,147,448
OPHTHALMIC APPARATUS
Filed Aug. 7, 1935 3 Sheets-Sheet 3

INVENTOR
Orval W. Lee

Patented Feb. 14, 1939

2,147,448

UNITED STATES PATENT OFFICE 2,147,448

OPHTHALMIC APPARATUS

Orval W. Lee, Spokane, Wash.

Application August 7, 1935, Serial No. 35,120

18 Claims. (Cl. 88—20)

The present invention relates to improvements in ophthalmic apparatus comprising a trial frame and the lens-cells used in combination therewith, for the purpose of adjustably positioning lenses before the eyes to determine errors of refraction. The invention is especially related to the diagnostic lenses described in my Patent No. 2,024,376, wherein the requirements relative to the combination of lenses, presents certain problems not solved by the prior art and the present invention solves those problems in a practical and efficient manner. More particularly, the present invention represents a practical application and improvements in the lens holder and lens-cells shown in Figure 7 of the aforementioned patent.

In carrying out my invention I provide a plurality of lens-cells of appropriate size for holding the small diameter lenses of my previous invention. Anterior and posterior lens-cells are employed and these are provided with complementary engaging tongues and grooves, whereby any anterior lens-cell may be interlockingly engaged with any posterior lens-cell and the two combined lens-cells rotated as a single unit in the lens holder of the trial frame. Each lens holder is adapted to receive two properly combined lens-cells and it is impossible to position two improperly combined lens-cells in the lens holder.

Due to novel improvements in the lens-cells and lens holders, the radial position of the axis of a cylindrical lens is readily determined when such cylindrical lens is in the posterior lens-cell and thus obscured by the anterior lens-cell; which problem is presented by my previous invention aforesaid.

Due to improvements in the lens-cells for accessories such as prisms, maddox rod, etc., these various diagnostic aids may be adjusted to the required position anteriorly of any spherocylindrical combination of lenses.

The improved trial frame of my invention is susceptible of the various adjustments necessary for properly positioning the diagnostic lenses before the eyes in the several required positions. Due to the novel construction of the lens holders, the lens-cells are supported above and below the horizontal diameter and are effectively held parallel to the lens holder. The trial frame is provided with improved nose-bridges and temples, both of which are selectively interchangeable and detachable, whereby said parts may be cleansed or sterilized after each instance of use, as is in accordance with modern sanitation and good taste. Worm and gear elements are employed to independently angle each temple in a vertical plane with respect to the vertical plane of the trial frame and an improved spring is employed to provide a restricted movement of the temples in a horizontal plane.

The invention resides in extensive innovations in the structure, combination and arrangement of the parts, and teaches the interlocked engagement of the lens-cells rotatably held in the adjustable holders of the trial frame to form a diagnostic unit at each instance of use, and this diagnostic unit can with facility be adjusted to, raise, lower, angle and rotate the lenses to their required positions, and to dispose the combined lenses at the required distance from the eye and at the required position to center with the eye in each instance.

The accompanying drawings illustrate the preferred physical embodiment of my invention.

The lens-cells of the present invention may be adapted to the improved diagnostic lenses described in my Patent No. 2,024,376. That invention taught disposing a convex spherical lens forwardly of a concave cylindrical lens and thus presented the problem of locating the axis of the concave cylindrical lens when the lenses were mounted in opaque discs of greater diameter than the lenses. This heretofore unsolved problem has restricted the improved test lenses of the prior art to forwardly disposed cylindrical lenses which presented obvious inaptitudes.

The present invention provides improved interlocking lens-cells, whereby two combined lenses are rotated as a single unit and whereby the axis marking on the obscured cylindrical lens-cell is indicated by a mark upon the front face of the lens-cells combined therewith and anteriorly thereof. The lenses of my previous invention are preferably of small diameter and the present invention provides lens-cells of appropriately larger diameter for convenience in handling said lenses.

Figures 15, 16:
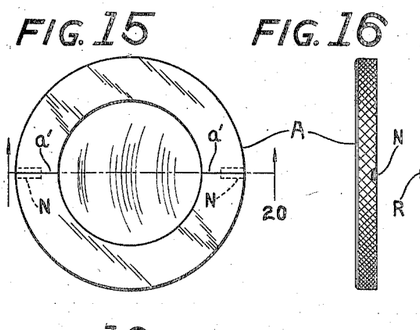
Figure 15 is a front view of an anterior lens-cell.
Figure 16 is an edge view of the same.
Figure 17:
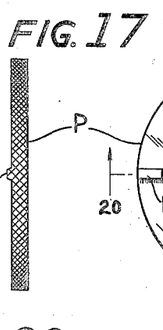
Figure 17 is an edge view of a posterior lens-cell.

Figure 15 shows a front view of an anterior lens-cell A; the grooves N, N, being on the rear side they are shown in dotted lines and are better seen in Figure 16 showing the right edge of the same lens-cell. Figure 17 shows the right edge of a posterior lens-cell P, which is also shown in front elevation in Figure 18, the tongues R, R, being shown in both diagrams. The tongues R, R, of the posterior lens-cell P are preferably slightly tapered to facilitate engagement with the complementary grooves N, N, of the anterior lens-cell A. These tongues and grooves extend radially inward from the circumference of the lens-cell and terminate, whereby diametrical movement of the combined lens-cells is precluded and whereby the tongue and groove is plainly visible from the edge of the lens-cell to facilitate engagement when two lenses are combined in the required manner.

According to my aforementioned invention, the plano sides of the lenses are placed adjacent; and in conformity thereto, the tongues R, R, and the grooves N, N, are placed on the surface adjacent the plano side of the lens. This assures proper combination of the lenses in conformity with the disclosure of the aforementioned invention.

Figure 2:
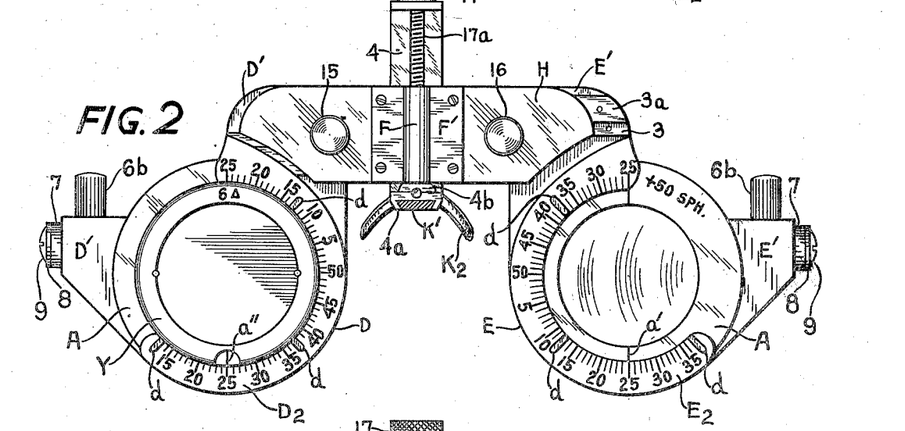
Figure 2 is a front view of the same, illustrating the independent adjustment of the two lens holders and shows one holder occupied with lenses and the other holder occupied with lenses and a prism; the transverse adjusting screw is removed and the bridge-bar is shown in section in its guide.

It will be readily apparent that the tongues R, R, can with facility be engaged with the grooves N, N, and the combined lens-cells handled as a single unit with greater facility than were they not so engaged and otherwise subject to diametrical movement one upon the other. Due to this interlocking engagement, the combined lens-cells are rotated as a unit in the lens holder. As shown in Figure 15, the anterior lens-cell A is provided with a line $a'$ indicating the diameter corresponding to the grooves N, N. Each anterior lens-cell is similarly marked, irrespective of whether the lens-cell contains a spherical or cylindrical lens. The line $a'$ indicates the axis of the cylindrical lens contained in that anterior lens-cell; or when the anterior lens-cell contains a spherical lens, said line $a'$ indicates the axis of the cylindrical lens contained in any posterior lens-cell with which that anterior lens-cell may be combined. For this reason it is essentially important that each cylindrical lens contained in a posterior lens-cell be positioned with the axis of said cylindrical lens corresponding to the diameter coincident with the tongues R, R; whereby said axis will coincide with the indicating line $a'$ when the tongues R, R, of the posterior lens-cell are engaged with the complementary grooves N, N, of any anterior lens-cell. As seen in the top plan view of Figure 13, each lens pocket is adapted to hold two lens-cells simultaneously; and as seen in Figure 2, the axis of cylindrical lens in the obscured posterior lens-cell can conveniently and accurately be rotated to any desired position relative to the protractor scale, by observing the position of the indicating line $a'$ on the front surface of the anterior lens-cell which in this instance is indicated as a +50 SPH.

Figures 13, 14:
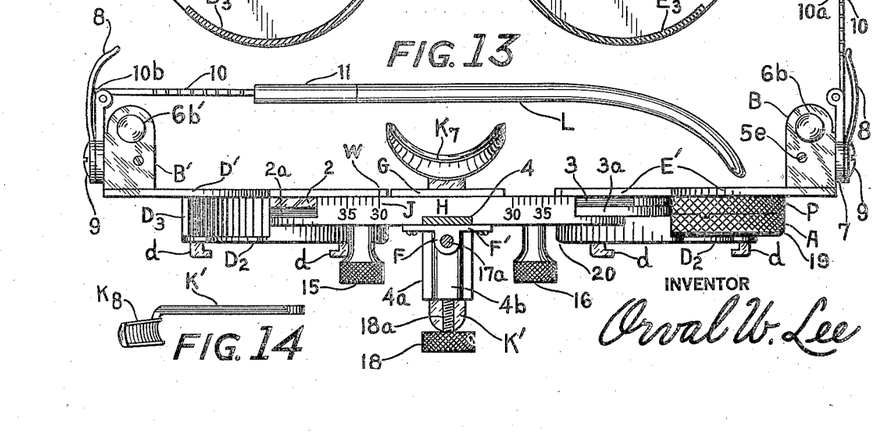
Figure 13 is a top plan view of my invention showing the interlocked lens-cells in the lens pocket of the trial frame, with the vertical adjusting bar and screw shown in section; and discloses the graduated scales for indicating the independent adjustment of the pupillary distance; one temple is shown folded, with its spring in repose; the other temple is in operative position and shown in section.
Figure 14 shows a side view of an improved interchangeable nose-bridge.

The anterior lens-cells are of a uniform thickness slightly greater than the uniform thickness of the posterior lens-cells and the combined thickness of an anterior and a posterior lens-cell is complementary to the lens pockets of the improved trial frame, as is best seen in Figure 13. The thickness of two anterior lens-cells precludes erroneous inserting of two such lens-cells in the same lens pocket and the projecting tongues R, R, of the posterior lens-cells likewise precludes the erroneous inserting of two posterior lens-cells in the same lens pocket, thereby assuring proper combination of the lenses in accordance with the disclosure of the aforementioned invention.

It is to be understood that the various references to my aforementioned invention are intended only as disclosing one manner of employing the present invention and that the present invention does not embrace the coordination of the lenses as was claimed in my previous invention.

The front edge of each anterior lens-cell is preferably chamfered to facilitate inserting the combined lenses into the lens pocket in the manner illustrated in Figure 1, wherein it will be seen that the lens-cells are inserted between the protractor member E2 and the holder plate E', until they are adapted to the position shown immediately below in Figure 2. The chamfer 19 on the front edge of the anterior lens-cell is made complementary to the blunted angle 20 formed when the protractor member and side walls of the lens pocket are stamped from a single piece of sheet metal and it will be clear that this construction precludes introducing the combined lens-cells into the lens pocket backwards; it being understood that the rear edge of the posterior lens-cell is not chamfered and of course the chamfer 19 and blunted angle 20 are made to have sufficient magnitude to accomplish the desired result.

Figure 1:
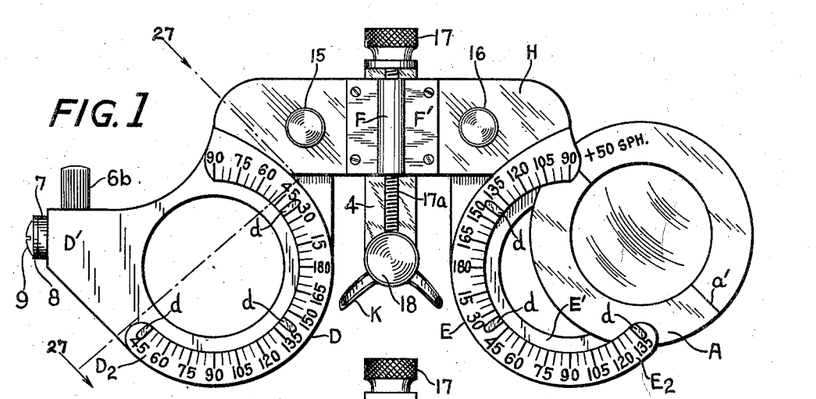
Figure 1 is a front view of my improved trial frame, in minimum adjustment and illustrates the manner of inserting the lens-cells in the holder.
Figure 3:
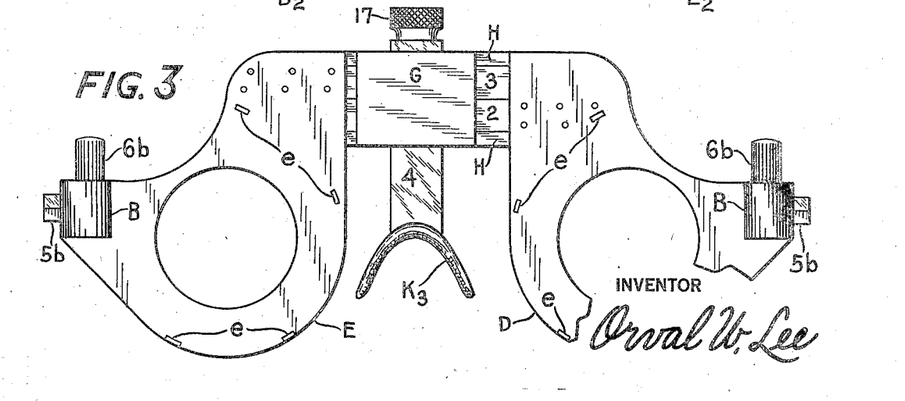
Figure 3 is a rear view of the same, independently adjusted oppositely to Figure 2 and with the temple parts removed to disclose the squared shaft.
Figures 4, 5, 6, 7, 8, 9, 10, 11, 12:
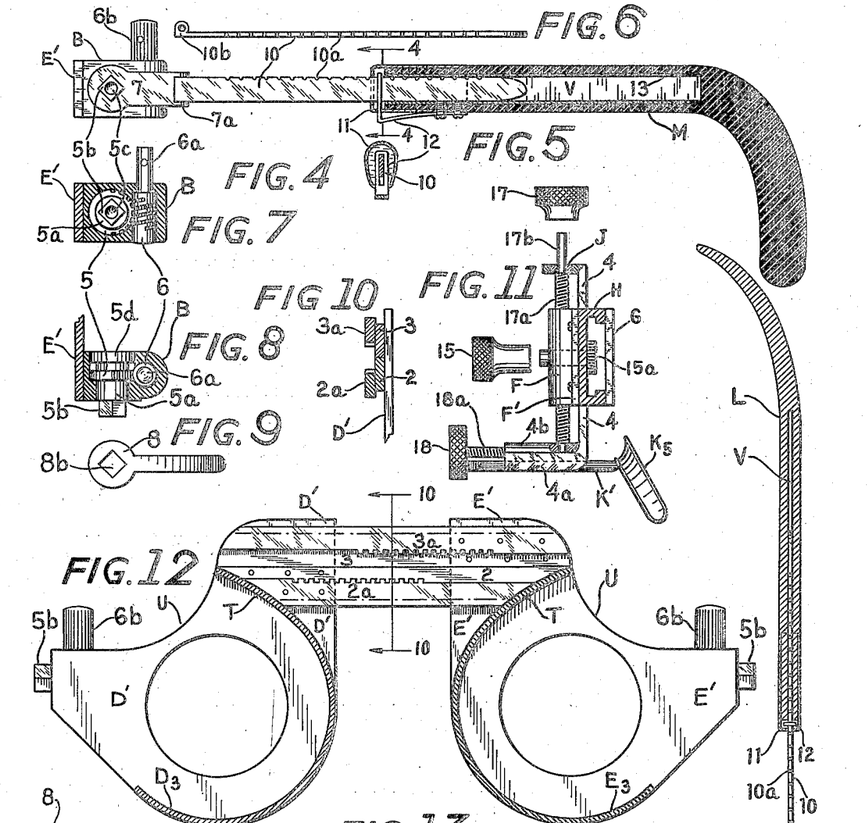
Figure 4 shows a vertical transverse section of my improved temple, taken on the line 4—4 of Fig. 5.
Figure 5 shows a side elevation of my improved construction for adjusting the angle of the temple and the temple prong is shown in section to disclose the telescopic engagement and detent.
Figure 6 shows an edge view of the notched temple bar and discloses the squared hinge butt.
Figure 7 shows a vertical section disclosing the worm and gear members for angling the temple.
Figure 8 shows a horizontal section disclosing the worm and gear members for angling the temple.
Figure 9 shows a face view of the tension spring for the temple.
Figure 10 shows section of the slide-bars and racks taken on the line 10—10 of Fig. 12.
Figure 11 is a side view, partly in section of the central housing as it appears after removing the slide-bars shown in Fig. 10, and discloses my improved construction for vertical, transverse and interpupillary adjustments.
Figure 12 is a front view of the lens holders after removing the central housing shown in Figure 11; the front face of the lens pockets being cut away and the edge walls of the pockets shown in section.
Figure 27:
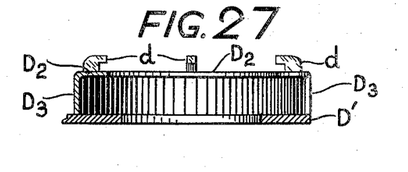
Figure 27 shows a section of a lens holder taken on the line 27—27 of Figure 1.

A section of the opposite lens pocket D is shown in Figure 27, the view being indicated by the line 27—27 of Figure 1. In Figure 27, it will be seen that the protractor member D2 is supported by the edge wall D3; these parts are preferably fashioned as a single piece of material and are permanently joined to the holder plate D' by any commercially practical method; as for instance they may be positioned by tongues and slots as indicated at e in Figure 3 and the contacting surfaces soldered electrically. In Figure 12 the protractor member is cut away and the edge wall D3 is shown in section. As shown in this figure, the lens-pockets are semicircular with a curvilinear tangent T extending upward and outward. That is to say, that the edge wall D3 or E3 is semicircular, with the diameter of each inclined inwardly and upward; the upper portion of the wall being extended tangentially upon a radius equal to the diameter of the semicircle. In the present instance said diameters are inclined at an angle of 45 degrees from horizontal and the tangent curve T extends to a point above the vertical diameter of the lens pocket. The inside diameter of said semicircle is complementary to the diameter of the lens-cells, whereby each lens-cell has a bearing surface upon one half of its circumference, the lens-cells being manually rotatable within said bearing surface of the lens pocket. The plane of the lens-cells is maintained by the protractor member D2 which is spaced at the required distance from the holder-plate D' as shown in Figures 13 and 27. As seen in Figures 1 and 2 the protractor member D2 forms a retaining plate extending to the vertical diameter at the top of the lens-cells, thereby assuring constant plane of the lens-cells relative to the holder plate and consequently relative to the eye. Inasmuch as the protractor exceeds 180 degrees it is obvious that the edge wall D3 (Figure 12) must necessarily be flared to permit of the required insertion and removal of the round lens-cells; which requirement is met by the previously described tangent extension of the edge wall shown at T in Figure 12. The holder plates D' and E' are provided with the necessary aperture and the outer upper portion of each, is scalloped inwardly at U to facilitate insertion, rotation and removal of the lens-cells.

In trial frames of the prior art, the lenses have been unsupported above the horizontal diameter and consequently the plane of the lenses was subject to variations due to freedom of movements of the lenses in their holders. It is a well established fact that inclining the plane of a lens produces a cylindrical effect; and in lenses of short focal length, the induced cylindrical effect is considerable. It is therefore apparent that the improvements just described assure greater accuracy in ophthalmic procedure.

The lens pocket construction just described is preferable; however, the edge wall D3 may be supplanted by a suitable number of post members attached to the holder plate and protractor plate, in that manner which has long been conventional in this art.

In trial frames of the prior art, it has been the invariable practice to indicate the rotation of cylindrical lenses by degrees of a circle. Usually, each five degrees is marked and each fifteen degrees numbered as is shown in Figure 1. The three digits required, results in crowding of the numerals. No practical use is made of the single degrees and the accuracy is not dependable for less than five degrees. To obviate these inaptitudes and provide greater accuracy, I have invented a new and improved method of indicating the rotation of cylindrical lenses. In Figure 2, I show my improved trial frame adapted to indicate the rotation of cylindrical lenses, prisms, etc., in percentages of the circumference of a circle; each single division being marked and each fifth division being numbered. Each division represents a hundredth part of 360 degrees or 3.6 degrees and consequently provides smaller divisions of the scale than does the conventional scale shown in Figure 1. The requirements of numbering does not exceed two digits and there is no crowding of the numerals. This improved method provides a more legible and accurate scale than is afforded by trial frames of the prior art. For ophthalmic purposes the opposite radial divisions are numbered alike.

Figure 18:
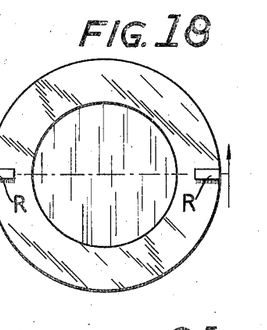
Figure 18 is a front view of the same.
Figure 19:
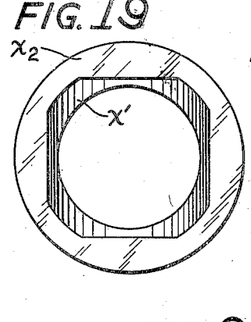
Figure 19 shows the improved structure of a lens-cell for a cylindrical lens.
Figure 20:
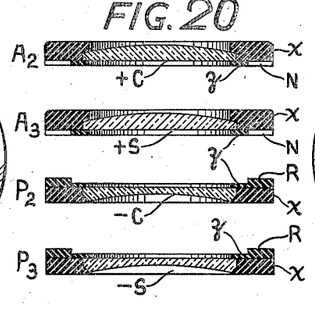
Figure 20 shows four diagrams, illustrating my improved method of mounting the lenses, each diagram showing a different type of lens.

Figure 20 shows four diagrams illustrating my improved method of mounting the lenses in their respective cells, the sectional views being indicated by the lines 20—20 in Figures 15 and 18. The anterior lens-cell A2 contains a plano-convex cylindrical lens +C and the anterior lens-cell A3 contains a plano-convex spherical lens +S. The posterior lens-cell P2 contains a plano-concave cylindrical lens —C and the posterior lens-cell P3 contains a plano-concave spherical lens —S. Each lens-cell comprises two perforated disc-like portions $x$ and $z$; the major portion $x$ is recessed to receive the lens and the portion $z$ serves as a perforate cover plate to retain the lens in the recess. The major portion $x$ is individually adapted to the lens contained therein; as for instance, Figure 19 illustrates an adaption for a cylindrical lens. The base $x'$ of the recess is complementary to the curvature of the cylindrical lens to be mounted therein and is of the required depth to provide for the plano side of said cylindrical lens to lie flush with the surface of said disc. This recess is preferably a square with the corners blunted as shown. The cylindrical lens is edged to the same shape and size and imbedded in the recess, thereby forming a plane surface to which the retaining disc $z$ (Fig. 20) is rigidly secured. The retaining disc carries the aforementioned tongues or grooves as the case may be and is therefore aligned with the axis of the cylindrical lens corresponding with said tongues or grooves. My previous invention described an improved method of designating cylindrical lenses by the location of the refractive median and in conformity thereto the sectional views of Figure 20 show the refractive median aligned with said tongues and grooves. It will of course be understood that either the axis or the refractive median may be thus aligned.

This improved method of mounting precludes all possibility of the cylindrical lens turning in the lens-cell and assures constant position of the cylindrical lens with relation to the tongues or grooves. Each cylindrical lens is similarly mounted, with the curved surface fitted into a recess adapted to the curvature of that particular cylindrical lens, convex or concave as required. Beveling of the lenses is unnecessary, but they may be slightly chamfered to avoid chipping at the edges.

Figure 23:
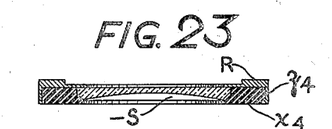
Figure 23 shows a sectional view of a modified assembly of a lens-cell.

These discs may be of any suitable material, such as Zylonite, hard rubber, Bakelite, or other plastic mould material and the two separate portions joined by any method appropriate to the material of which they are made. They may also be made of cast aluminum alloy and joined by any method appropriate for that material. Interchangeability of lenses in the lens-cells is unnecessary and preferably the two portions of each lens-cell are permanently joined, to preclude all possibility of error that might otherwise result from subsequent interchanging of the lenses in their cells. As shown in the sectional view of Figure 23, the retaining portion $z_4$ may be of thin metal and spun over the edge of the major portion $x_4$, suitable means being provided to hold the two portions against relative rotation.

Figure 21:
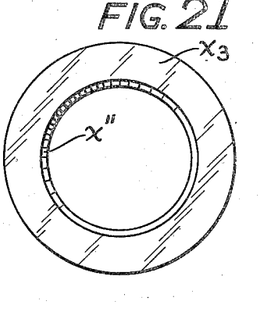
Figure 21 shows the improved structure of a lens-cell for a spherical lens.

To adapt the major portion $x$ of the lens-cells to the normal round shape of the spherical lenses, a round recess is employed. As shown at $x_3$ in Figure 21, the recess $x''$ forms a ledge or shoulder with the necessary central aperture. The recess is of the required depth to provide for the plano side of the lens to lie flush with the surface of the disc and the retaining disc $z$ (Fig. 20) is rigidly secured to this plane surface. Each spherical lens is similarly mounted and the necessary variations in the depth of the recess is made to accommodate the different lenses. The lenses are preferably small and thin and it is unnecessary to bevel the convex spherical lenses, but they may be slightly chamfered to prevent chipping at the edge. In concave spherical lenses having a short radius of curvature, it is advisable to bevel the edge adjoining the curved surface to lessen the edge thickness; and the plano edge may be slightly chamfered. As previously described, each anterior lens-cell is provided with a line $a'$ for indicating the axis of the cylindrical lens in the posterior lens-cell with which said anterior lens-cell may be alternately combined; and therefore, in joining the two portions of each anterior lens-cell, it is essentially necessary that the grooves N, N, be positioned in coincidence with the diameter indicated by the line $a'$, and also essentially necessary that the grooves N, N, or the tongues R, R, be aligned with the axis (or median) of the cylindrical lens mounted in that particular lens-cell. It will be readily understood that this simple expedient assures an accurate index for the axis of a cylindrical lens in the anterior lens-cell and for the axis of a cylindrical lens in a posterior lens-cell interlocked with an anterior lens-cell.

Figure 22:
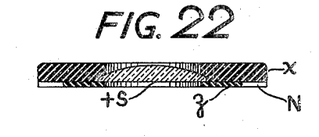
Figure 22 shows a sectional view of a lens-cell adapted for lenses of excessive curvature.

The lens-cells are preferably, either 36 millimeters or 38 millimeters in diameter and of the least thickness practical, say 3 millimeters thick for the posterior cells and 3.5 millimeters thick for the anterior cells. The edges of the lens-cells are preferably knurled or milled to facilitate rotating the lenses in the lens pocket of the trial frame. The lenses are diaphragmed by a central aperture in the lens-cell and preferably this aperture is 24 millimeters in diameter. In lenses of such curvature that 24 millimeters diameter produces a lens too thick to be adaptable to said thickness of the lens-cell, such lenses are made of lesser diameter to reduce the thickness of the lens as is shown in Figure 22. The curvature of the required cylindrical lenses will not necessitate this reduction in size and only spherical lenses of excessive curvature need be of the reduced size.

As previously described, the lens pockets are adapted to engage an anterior lens-cell A and a posterior lens-cell P, simultaneously in a single pocket, as is shown in the top plan view of Figure 13; and for occasions where sphero-cylindrical combinations are not required, empty lens-cells are provided in anterior and posterior pairs, as is also imperforate discs for occlusion purposes.

Figure 24:
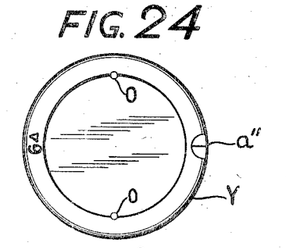
Figure 24 shows my improved prism-cell in front elevation.
Figures 25, 26:
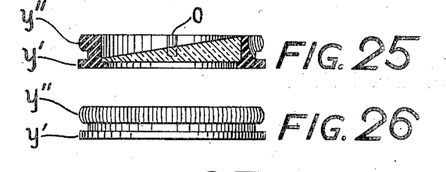
Figure 25 is a sectional view of the same.
Figure 26 is an edge view of the same.

In Figures 24, 25 and 26, my improved prism-cell Y is shown in front elevation; in section; and an edge view. The prism-cells are of smaller diameter than the described lens-cells and are adapted to engage the clips $d$, $d$, $d$, shown in Figures 27, 1 and 2. These clips are fashioned as small offset bracket lugs, rigid with the protractor plate $D_2$. As shown in the edge view of Figure 26, each prism-cell is provided with a flange $y'$ adapted to engage between each clip $d$ and the protractor plate $D_2$. The forward portion of the prism-cell is provided with a flanged crown $y''$, preferably milled to facilitate manual rotation. The channel between said flanges provides the required clearance for engagement with the aforementioned bracket clips. The prisms are preferably round and snugly fitted in a recess that forms a retaining shoulder with the necessary aperture; key-pins $o$ and $o$ retain the prism in position and also prevent rotation of the prism in its cell, thereby assuring fixed relation. The crown portion $y''$ is indented or cut away at the point where the line $a''$ indicates the base of the prism. The prism-cell may with facility be held by the crown $y''$ and placed in the operative position shown in Figure 2 and rotated to required position relative to the protractor scale, by observing the indicator $a''$. It will be seen that the prism is placed forward of the lens-cells, whereby a prism may be employed in conjunction with any sphero-cylindrical combination without disturbing the required position of the latter. The recess of the cell Y may hold a maddox rod, colored blank or other accessories used in ophthalmic practice.

The trial frame comprises a pair of lens holders D and E, adjustably supported in a central housing H which is fashioned as a T-guide having a length exceeding the interval between the lens holders when the trial frame is in maximum adjustment. As best seen in Figure 12, the perforated holder plates D' and E' extend above the lens pockets and each is provided with an inwardly extending horizontal slide-bar and a rack. The slide-bar 2 and the rack 2a are attached to the plate D' and the slide-bar 3 and the rack 3a are attached to the plate E'; the extent of attachment being indicated by the rivets; but of course they may be attached by any other commercially practical method. It will be seen that these slide-bars are superimposed one above the other when in operative position and are slidable one upon the other in the central housing H. Each slide-bar is attached to the forward surface of its respective plate and each rack is attached to the forward surface of its respective slide-bar.

In Figure 12 I indicate a section of these parts, shown immediately above in Figure 10, where it will be seen that the rack 3a is offset upward and the rack 2a is offset downward; the intervening clearance provides space for the pinions by which the racks are moved; one of these pinions 15a is shown in Figure 11, where the central housing H is shown in section. It will be seen that the aforementioned section of the slide-bars and racks is complementary to the T-guide of the central housing H and that the described offset of the racks adapts them to fitted engagement in the undercut channel of the T-guide formed in the central housing H. The open side of this T-guide is rearward and is closed centrally by a plate G, shown in Figures 11, 13 and 3. This plate G is flush with the holder plates D' and E' and fills the space therebetween when the holders are in position of minimum adjustment. Obviously, the slide-bars 2 and 3 have a bearing against the plate G, thereby precluding any possibility of twisting them out of their guide. The plate G serves the further purpose of precluding any spreading of the T-guide. Referring again to Figure 12 it will be seen that the racks are cut away on the end portions so as to preclude engagement of both racks with either pinion and it will be clear that the slide-bar and rack of each lens holder can readily be inserted from opposite ends of the central housing H shown in section in Figure 11. When thus assembled it is apparent that the parts are well supported by long bearing surfaces, thus assuring sturdiness and stability.

Obviously, the lens holder D can be adjusted by turning the knob 15 to which is attached the aforementioned pinion 15a; and the lens holder E can be adjusted by turning the knob 16 that is provided with a like pinion (not shown). As seen in Figures 1 and 2, the adjusting knobs 15 and 16 are appropriately located on the front wall of the central housing H. The rear of this housing is open when the slide-bars and racks are removed; whereby the pinion shafts can readily be assembled in position from the rear and rigidly attached to their respective knobs. To facilitate minor adjustments of the pupillary distance, these pinions are preferably, as small as practical. It will be seen that the pinions engage separately with the racks and therefore the lens holders can be independently adjusted as is often required. Obviously, the lens holders may be made simultaneously adjustable by extending the rack 3a to engage the pinion 15a and omitting the other pinion and knob.

As shown in the top plan view of Figure 13, the holder plates D' and E' are each provided with a notch or line W and the top of the central housing H is provided with a scale J; whereby the movements of each lens-holder are independently indicated by the relation of each line to said scale, which is preferably graduated in millimeters. The described indicating lines W are preferable to the small pointers found in trial frames of the prior art, as such pointers are necessarily small and liable to become bent and consequently inaccurate.

Vertical adjustment of the lens holders is accomplished by raising or lowering the slide-bar 4, which may be provided with a graduated scale; but preferably, the extent of the vertical adjustment is measured by an improved method, separately provided; and the same is true of the transverse adjustment. Referring again to Figure 11 and also to Figure 13, it will be seen that the vertical slide-bar 4 is slidably mounted in a recess in the front wall of the central housing H and retained in position by the plate F' which is provided with a threaded barrel F, to receive the vertical adjusting screw 17a. As best seen in Figure 11, the vertical slide-bar is provided with right-angled projections at the top and bottom; preferably, the upper projection is provided with a bore slightly larger than the screw 17a, into which is fitted the thrust collar J. This construction enables the screw 17a to be inserted through said bore, then threaded through the vertical barrel F until it is pivoted in the block 4b; the thrust collar J is then assembled in position to provide a bearing for the upper stem 17b to which is secured the knob 17. The thrust collar J may be secured in position by any appropriate means and as there is no need to disassemble these parts, the thrust collar may be permanently secured; as for instance, it may be electrically soldered in position, as this method is quick, requires no prolonged heating of the parts and it is not difficult to exclude adjacent movable parts from the joint. The several knobs are preferably secured to their stems by the same method and the plate F' may be permanently joined to the housing H in a like manner instead of by screws as shown. The vertical slide-bar 4 and the adjusting screw 17a are of sufficient length for the required purposes of adjustment and as the vertical adjusting screw 17a is shouldered at the top and bottom and pivoted on its stems, plainly the housing H may be raised or lowered by turning the knob 17; and inasmuch as the housing H carries the slide-bars to which are attached the lens holders, the latter are accordingly raised or lowered with relation to the support K which is designed to rest upon the bridge of the nose of the patient.

Trial frames of the prior art have usually been made with a permanently attached nose-bridge pivotably mounted. The wide variations of the width of the nose of different persons and variations in the angle of crest make it impossible for one nose-bridge to adequately suffice for the numerous variations found in different persons. Furthermore, the indiscriminate use of a permanently attached nose-bridge is very unsanitary. For these good and sufficient reasons, the trial frame of my invention is provided with improved detachably interchangeable nose-bridges of several shapes and sizes, whereby the appropriate shape and size of nose-bridge can be employed for each patient and then properly cleansed or sterilized after each instance of use.

Referring again to Figure 11 it will be seen that the nose-bridge $K_5$ is provided with a slide-bar K' which is horizontally slidable in the guide 4a which is fashioned on the lower horizontal projection of the vertical slide-bar 4. When the trial frame is in operative position upon the patient's face the end of the slide-bar K' impinges against the knob 18 which is rigid with the screw 18a; and obviously the forward adjustment of the lens holders can be regulated by turning the knob 18 as required. In Figure 2, this screw and knob are removed and it will be seen that the block 4b is provided with a hole; this hole is threaded to receive the screw 18a. In the same figure it will be seen that the lower projection of the vertical slide-bar 4 is provided with a dove-tail guide 4a complementary to the beveled slide-bar K' shown in section. As best seen in Figure 13 the forward end of the slide-bar K' is rounded or tapered to facilitate insertion into the guide 4a. It will be readily understood that any selected bridge as K, $K_2$, $K_3$, $K_5$, $K_7$, or $K_8$ can with facility be quickly inserted into the guide 4a and its forward adjustment regulated by turning the knob 18; the vertical adjustment of course being accomplished by turning the knob 17. In carrying out my invention I provide several shapes and sizes of these interchangeable nose-bridges; say ten or twelve, each adaptable to a certain type of nose; as for instance the type shown detached at K8 in Figure 14 is especially suitable for a broad nose having but a slight angle of crest; and as the bridge of such a nose is relatively low, the bridge portion K8 is fashioned below the slide-bar K', to minimize the required vertical adjustment. The bridge K5 shown in Figure 11 is suitable for a prominent nose having considerable angle of crest and as the bridge of such a nose is relatively high, the bridge portion K5 is fashioned above the slide-bar K', to minimize the required vertical adjustment. Other shapes and sizes are shown in Figures 1, 2, 3 and 13.

These interchangeable nose-bridges can be economically produced, with the bridge portion and the slide-bar of a single piece of material and a liberal assortment of shapes and sizes can be supplied at small cost. Obviously, when the bridge portion appropriately saddles the nose as is possible with the selectively interchangeable nose-bridges of my invention, the appliance is properly centered on the median line of the nose and the lens holders can be independently adjusted to the required pupillary distance of each eye; thereby accommodating for inequalities, as is frequently required. Obviously, it is impossible to maintain the slightly curved nose-bridge of prior art trial frames in a central position upon the nose and consequently the independent pupillary adjustment of such prior art trial frame is neither accurate nor constant.

As will be seen from the drawings which are shown to a scale so as to represent actual size in the printed patent; all of the previously described parts are of sufficient length and width to assure rigidness, stability and dependable alignment. The fewness of the parts and the simplified sturdy construction assures freedom from the annoyance of mechanical difficulties. Dainty, ornate appearance is not a prerequisite of a trial frame and as the appliance is in use upon the face of the patient for a short period only, dependable alignment, accuracy and stability are far more important than lightness of weight. In carrying out my invention, I have minimized the weight of the appliance by the fewness of the parts, rather than by the smallness of the parts and it will be seen that my invention provides an appliance that will give dependable service for a long period of repeated use.

Due to the variations in the relative height of the ears of different persons or the two ears of the same persons it is essentially necessary that the angle of the temples with relation to the plane of the lens holders should be independently adjustable. It is also essentially important that such adjustment be positive, gradual and secure.

In carrying out my invention, I employ a most simple and effective means of angling the temple. As shown in the plan view of Figure 13 a block B and B' is secured to the outer extreme of each respective lens holder. The means for adjusting the angle of each temple is housed in each of these blocks and controlled by the conveniently located knobs 6b and 6b'. In Figures 5, 7 and 8, I show a number of associated diagrams of my improved means for angling the temples. Figure 5 shows a side elevation of the temple angling means as it appears after removing the screw 9 and the spring 8. Figure 7 shows a vertical section of the same, with the knob 6b removed; and Figure 8 shows a horizontal section of the same, the member 7 being removed in the sectional views to disclose the parts; and the spring 8 being separately shown below in Figure 9.

As best seen in the vertical section of Figure 7, the worm 6 is vertically journaled in the block B and engages the worm gear 5. As seen in the horizontal section of Figure 8, the worm gear 5 is provided with a shaft 5a, which has a squared end 5b for engaging the radius arm 7 and the spring 8. As seen in Figures 5 and 7 this squared shaft is provided with a hole 5c which is threaded to receive the screw 9 shown in Figure 13; whereby the arm 7 and the spring 8 are secured in operative position. When the knob 6b is rigidly secured to the stem 6a, it is plain that the worm 6 can be turned by the knob 6b and that the worm 6 will turn the worm gear 5 and consequently rotate the shaft 5a, thereby angling the arm 7 which is secured to the squared end 5b. The arm 7 is provided with means at 7a for pivotable attachment of the temple-bar 10; the latter member being adapted to interchangeably engage the detachable temple prong M having a downwardly curved end for engagement behind the ear of the person, or the inwardly curved temple prong L shown in Figure 13, which latter member is designed to engage the rear curvature of the person's skull.

As soon in the vertical section of Figure 7 the worm 6 is cut into the shaft rather than cut onto the shaft and the shaft is provided with a stem 6a of smaller diameter; the block B is bored complementary to the worm and its stem and it will be apparent that the worm can with facility be inserted from the larger end of the bore, thereby closing the bore; and that the shoulder of the smaller bore will provide a bearing for the upward thrust, the knob 6b is then rigidly secured to the stem 6a, thereby providing a bearing for the downward thrust. As seen in the horizontal section of Figure 8, the block B is bored for the shaft 5a and also has an enlarged bore to admit the worm gear 5; the end of the shaft is enlarged complementary to this larger bore as is shown at 5d and it will be readily apparent that after the worm 6 has been assembled in operative position that the member comprising the parts 5, 5a, 5b, 5c and 5d which are a single unit, can readily be inserted through the larger bore; the part 5d thereby closes the bore and also provides a larger and longer bearing surface. It will be apparent that the shoulder of the smaller bore provides a bearing for the outward thrust; and when the arm 7 and spring 8 are secured in operative position by the screw 9, the inner face of the arm 7 has a bearing against the block B for the inward thrust. The block B is provided with a slightly raised facing or boss, to assure clearance of the arm 7. As there is no occasion to disassemble the parts, the arm 7 may be permanently secured to the squared shaft by any appropriate means, or the arm may be detachable, in which latter case a pin 5e shown in Figure 13 may be employed to engage in the clearance between the parts 5 and 5d, to prevent displacement of the parts when the screw 9 is removed for replacement of the spring 8 as may occasionally be required. Lubrication of the parts is hardly necessary, but should such be desired for smooth action and to minimize wear, a small quantity of dry powdered graphite may be introduced into the clearance space between the parts 5 and 5d.

It will be readily apparent to persons skilled in the art that the worm and gear provide a positive means of angling the temple and that the same is free from the mechanical difficulties prevalent in structures having a multiplicity of parts. Obviously, the worm will turn the gear but the gear can not turn the worm and consequently the temple will remain constant in any adjusted position. The size of the block required to house the parts is small and these blocks can readily be secured to the holder plates D' and E' by any appropriate means; as for instance they may be positioned by dowels and soldered electrically. The knobs 6b and 6b' are shown on the upper side of the block, but should it be desired to locate them on the underside it is a simple matter to invert the blocks and reverse them to opposite holders, as they are necessarily left and right.

It is essentially necessary to provide adjustability for the length of temples, as the requirements vary greatly with different persons. In addition to the described means for angling the temples, I provide temples that are adjustable as to length and also readily detachable, whereby they can quickly and easily be removed for the purpose of cleansing or sterilizing, as is essentially necessary for sanitary reasons.

Referring again to Figure 5, each temple comprises two principal portions, a temple-bar 10 which is adapted to telescopic engagement with interchangeable temple prongs such as M and L; thus providing selectivity of different types of temple prongs, alternately as desired; and also providing for the employment of individual temple prongs for each patient and later sterilizing the temple prongs collectively. In this figure a temple prong M is shown in vertical section; the void V is complementary to the temple-bar 10 and in this instance the void is shown as being lined with a metallic sleeve 13, the temple prong being made of Zylonite, hard rubber, Bakelite or other plastic mould material. The forward end of the temple prong is provided with a ferrule 11 to which is attached a spring 12, shown under tension. As best seen in the associated transverse section of Figure 4, the spring 12 is provided with a vertical slot through which the temple-bar 10 passes. The upper end of said slot alternately engages with a selected one of the spaced notches 10a in the temple-bar and serves as a detent to secure the temples at the required adjusted length; said slot is of sufficient length to permit of the required movement to disengage the spring from the notches, whereby the temple prong may be adjusted throughout the limitations of the temple-bar 10, or removed, replaced, or interchanged with facility upon compression of the spring 12. The end of the temple-bar is tapered to facilitate insertion into the temple prong.

The end of the ferrule is slotted to admit the temple-bar and sufficient clearance is provided within the ferrule to permit of the required movement of the spring; and of course an opening is provided for the passage of the spring. The spring may be attached to the ferrule by any appropriate means; as for instance, by the illustrated screws threaded into the ferrule, temple prong and lining sleeve, thereby securing these parts together simultaneously. The spaced notches 10a in the temple-bar are preferably closely spaced and need not be deep; a coarse milled edge will suffice for the requirements.

The temple-bar 10 is provided with a squared butt 10b to limit its outward swing and is pivotably engaged with the arm 7; whereby the angular adjustment of the temple is accomplished by the worm and worm gear in the previously described manner. The spring 8 is held in alignment on the squared shaft 5b by engagement of the square hole 8b and is secured in place by the screw 9 shown in Figure 13. In this figure it will be seen that when the temples are spread open, the spring 8 contacts the temple-bar 10, thereby providing the required slight pressure of the temple prongs against the side of the head. It will also be apparent that when the temples are slightly folded, the action of the spring ceases, thereby precluding the possibility of the unpleasantness of the temples being forced across the face of the patient as sometimes occurs with trial frames of the prior art when diligence is not exercised while removing the trial frame from the face. In Figure 13, one temple is shown in closed position, folded against the appliance; and it will be seen that the spring 8 then contacts the aforementioned squared butt 10b to hold the temple in folded position. When both temples are thus folded, the appliance is compact and can conveniently be cased in an appropriate receptacle when not in use. In the same figure a temple prong L is shown in horizontal section (this figure being a top plan view); said temple prong is illustrated as being of metal, preferably of aluminum alloy and of course there is no need for the metal lining 13 shown in Figure 5; otherwise the structure is the same as previously described.

In the illustrations I have shown my improved trial frame as adjustable for different pupillary distances ranging from 60 millimeters to 80 millimeters; that is to say, 30 to 40 millimeters separately for each eye. Obviously, the appliance could be made adjustable for a lesser pupillary distance; but it is inconsistent to employ the same trial frame for the diminutive features of a small child as for the large proportions of some adult faces, or visa versa. Obviously, such extremes of adjustment would detract from the stability of the appliance. For this good and sufficient reason I prefer to provide my improved trial frame in sets of two, the one being adjustable to the aforementioned pupillary distances and the other adjustable to pupillary distances ranging from 50 millimeters to 60 millimeters (25 to 30 millimeters separately), the latter for use upon children and others with small faces. In this latter structure the length of the central housing H, the width of the plate G and the length of the slide bars 2 and 3 and their racks 2a and 3a are appropriately lessened, and the pinions and control knobs 15 and 16 located nearer together, thereby producing more suitable proportions in an appliance adapted for use upon small faces.

The two described sizes of my improved trial frame are preferably housed in a suitable case, together with say four pairs of interchangeable temple prongs and say twelve interchangeable nose-bridges of assorted sizes and shapes. For the convenience of the operator, such apparatus may be housed in a suitable compartment of the case containing the diagnostic lenses described in my Patent No. 2,024,376 aforementioned.

The utilization and employment of the apparatus will be readily apparent to those skilled in the ophthalmic profession. The advantages of the several improvements will be greatly appreciated by those who are mindful of the well established importance of the proper location of the lenses in relation to the eye; and by the utilization of the apparatus, refractive errors may be determined with greater convenience to the operator and greater comfort to the patient; and in accordance with modern sanitation; and in conformity to the precise requirements of the latest methods of determining the refractive errors of the human eye.

It will be readily understood that when the ophthalmic apparatus shown in Figure 2 is positioned upon the face of a person, the lenses contained in the lens-cells can be positioned at the required distance from the eyes by turning the knob 18 (Fig. 11), the temples can be lengthened or shortened as required by employing the showing in Figure 5, the lenses in their lens-cells can be disposed at the proper inclination relative to the eye by turning the knobs 6b and 6b' according to the relative height of each ear, the vertical adjustment can be accomplished by turning the knob 17 and the lenses can be adjusted to the pupillary distance of each eye independently by turning the knobs 15 and 16, the interlocked lens-cells can be manually rotated while they are effectively held parallel to the lens holders by the protractor members upon which the axis of a cylindrical lens obscure in the posterior lens-cell is indicated by the line a', the nose-bridge and temple prongs can with facility be expeditiously detached and cleansed and if need be the lens holders can also with facility be quickly removed from their engagement with the central housing, sterilized and again engaged with the housing, all without the use of a single tool.

The present invention is closely related to my own copending applications Serial No. 727,873 and No. 745,877 the former of which matured into Patent No. 2,024,376 for Diagnostic lens, and the latter discloses means adapted to engage in the lens pocket of the present invention, interchangeably with the present lens-cells, for the purpose of measuring the distance from the eye to a specified plane relative to the present lens-cells and for the purpose of determining the pipillary distance in that specified plane and in accordance with the teachings of the improved methods claimed in said latter application. In a single instance of use, an operator can employ the three said inventions as a complete working unit, to thereby attain an interrelated result in which all three of the said inventions mutually contribute.

In the invention herein disclosed, what I claim as new and desire to secure by Letters Patent of the United States is:

1. An ophthalmic trial frame comprising a lens holder, a shaft journaled horizontally on said lens holder, a radius arm rigid with said shaft, a worm gear rigid with said shaft, a worm engaged with said worm gear, means to turn said worm and thereby rotate said worm gear and said shaft, whereby said arm is angularly adjusted in a vertical plane with relation to the plane of said lens holder, a temple piece secured to said arm by a vertical pivot; whereby said temple piece is angularly adjustable in both the horizontal and vertical planes.

2. An ophthalmic trial frame carrying a horizontally journaled shaft, a worm gear rigid with said shaft, a worm engaged with said worm gear, a temple carried by said shaft, means to turn said worm and thereby rotate said worm gear and said shaft, whereby said temple is angularly adjusted in a vertical plane, and whereby said worm will hold said temple in its angularly adjusted position.

3. An ophthalmic trial frame comprising a worm cut into a shaft, an axial stem upon said shaft, a block having a stepped bore complementary to said shaft and stem, whereby said shaft closes the large end of the bore and has a thrust bearing against the shoulder of said bore, a knob rigid with said stem and in contact with the exterior of said block, whereby an opposite thrust bearing is provided; a worm gear upon a shaft, an enlarged end upon said gear shaft, said block having a second bore stepped complementary to said gear shaft and said enlarged end, whereby the enlarged end of said shaft closes the large end of said second bore and whereby the worm gear has a thrust bearing against the shoulder of said second bore; the smaller end of said gear shaft projecting externally of said block, a temple member rigid with said gear shaft and bearing against said block; said worm shaft and bearing against said block; said worm engaging said worm gear, thereby to actuate said temple member, and said block rigidly connected to said trial frame.

4. Ophthalmic apparatus comprising a pair of holder plates, a horizontal slide-bar rigid with each holder plate, a central housing, said horizontal slide-bars mounted in said central housing, means for longitudinally moving said slide-bars relative to said housing, a vertical slide-bar carried by said housing, means for actuating said vertical slide-bar, a guide member carried by said vertical slide-bar and disposed transversely of said holder plates, a nose-bridge member slidably engaged in said guide and means for limiting the extent of engagement therein, a lens pocket rigid with each of said holder plates, a posterior lens-cell and an anterior lens-cell interlockingly engaged with each other and rotatable as a single unit in one of said lens pockets, a worm and gear journaled on each of said holder plates, a radius arm rigid with each of said gears, a temple bar hinged to each radius arm, a spring cooperating between each radius arm and its respective temple bar, a temple prong in telescopic engagement with each of said temple bars, a detent cooperating between each temple bar and temple prong to releasably hold them in telescopic engagement, said lens-cells, said temple prongs and said nose-bridge member each being instantly removable and replaceable by thumb and finger grasp.

5. An ophthalmic trial frame comprising a rearwardly open T-guide, a plate closing the central portion of said guide to prevent spreading thereof, a pair of horizontal slide-bars superimposed one upon the other within said T-guide, a lens holder rigid with each slide-bar, a rack rigid with each slide-bar, the upper rack being offset upward with relation to its respective slide-bar, the lower rack offset downward with relation to its slide-bar, said T-guide engaging said offsets, the toothed edge of one rack disposed towards that of the other with clearance therebetween, a pinion engaged with each of said racks, said pinions pivoted in the forward wall of said T-guide, means to independently turn said pinions and thereby actuate said racks, and means to indicate the adjusted position of the lens holders.

6. An ophthalmic trial frame comprising a pair of lens holders, a vertically adjustable slide-bar cooperating with said lens holders, a horizontal projection on the lower end of said slide-bar, said projection being fashioned as a guide adapted to alternately retain selectively interchangeable nose-bridge members slidably therein, and a stop member movable to and from the end of said guide and disposed so as to impinge a nose-bridge member slidably engaged within said guide.

7. Ophthalmic apparatus comprising a pair of lens holders, a central support for said lens holders, a guide member carried by said central support and disposed transverse of said lens holders, a nose-bridge member carrying a flat bar adapted to alternate engagement and disengagement slidably with said guide member, a temple bar attached to each lens holder, a hollow temple prong for each temple bar, each temple bar adapted to telescopic engagement and disengagement within its temple prong, a detent cooperating between each temple bar and temple prong to lock them in telescopic engagement, said temple prongs and said nose-bridge member being instantly removable and replaceable by thumb and finger grasp.

8. In an ophthalmic trial frame, a horizontally journaled pivot, a radius arm rigid with said pivot, a temple vertically pivoted to said radius arm, a strap spring fixed to said horizontal pivot and urging said temple on its vertical pivot when said temple is in open position and said spring adapted to repose when said temple is slightly folded, and means for holding said horizontal pivot in a selected position of rotation.

9. A trial frame comprising a front member carrying a horizontally journaled pivot having an internally threaded end, a radius arm interlocked with said end, a strap spring aligned with said radius arm and interlocked with said end, a single screw engaged in said threaded end and holding said radius arm and spring in interlocked engagement with said pivot, a temple member vertically pivoted to said radius arm, said strap spring contacting said temple member and urging the latter upon its pivot, and means for holding said horizontal pivot in selected positions of rotation.

10. Ophthalmic apparatus comprising a lens holder, a temple bar pivoted thereto, a hollow temple prong, said temple bar slidably engaged within said temple prong, whereby the combined length of said engaged temple bar and prong may be adjusted as required, a number of spaced notches upon said temple bar, a spring detent upon said temple prong for engaging said notches, whereby the combined parts are secured at the adjusted length and whereby said temple prong is instantly removable when said spring detent is disengaged, a ferrule enclosing the engaging portions of said temple bar and spring detent, a portion of said spring detent projecting externally of said ferrule to provide for manual manipulation of said detent.

11. Ophthalmic apparatus comprising a lens pocket, an anterior lens-cell and a posterior lens-cell rotatably held in contact within said lens pocket, means upon the contacting faces of said lens-cells for interlocking one with the other, an index mark upon the front face of said anterior lens-cell, a protractor scale member cooperating with said index mark to indicate the percentage rotation of said interlocked lens-cells.

12. Ophthalmic apparatus comprising a lens pocket adapted to simultaneously hold two lens-cells, a posterior lens-cell and an anterior lens-cell adapted to simultaneous engagement within said pocket, a pair of tongues situated on the diameter of said posterior lens-cell and projecting from the forward surface thereof, a cylindrical lens mounted in said posterior lens-cell with the axis thereof registering with said tongues, said anterior lens-cell having grooves situated on the diameter of its rear face and adapted to engage with said tongues to hold said lens-cells in interlocked engagement for rotation as a unit in said lens pocket, said anterior lens-cell having an indicating line situated on the diameter on its front surface and registering with the aforementioned grooves, whereby when said lens-cells are interlockingly engaged, said indicating line registers with the axis of said cylindrical lens, a protractor scale member carried on the front face of said lens pocket and cooperating with said indicating line on the front surface of said anterior lens-cell to indicate the relative rotation of the cylindrical lens obscurely situated in said posterior lens-cell.

13. Ophthalmic apparatus comprising an anterior lens-cell and a posterior lens-cell, a retaining pocket adapted to hold said lens-cells in contact and rotatable therein, and complementary engaging means upon the contacting faces of said lens-cells for interlocking the same secure against rotation relative to each other.

14. Ophthalmic apparatus comprising a pair of lens pockets adapted to be respectively positioned one before each of a pair of eyes, a plurality of anterior lens-cells and a plurality of posterior lens-cells; complementary engaging means upon the respective lens-cells for interlockingly engaging any anterior lens-cell with any posterior lens-cell, each of said lens pockets adapted to alternately hold any one of said anterior lens-cells in contact with and interlocked with any one of said posterior lens-cells for rotation as a unit in said lens pocket, and said lens pocket constituting the sole means of holding said lens-cells in contact.

15. Ophthalmic apparatus comprising a lens pocket, an anterior lens-cell and a posterior lens-cell rotatably held in contact within said lens pocket, means upon the contacting faces of said lens-cells for interlocking one with the other, the forward edge of said anterior lens-cell being chamfered and said lens pocket corresponding thereto, thereby to preclude inserting said interlocked lens-cells in said pocket in reversed position.

16. In an ophthalmic trial frame, a lens pocket comprising a perforate holder plate, a rigid edge wall and a perforate protractor plate each exceeding 180 degrees of a circle, said protractor plate spaced parallel to said holder plate by means of said edge wall, said edge wall forming a semicircular bearing surface for one half of the circumference of lens-cells adapted therein and the remainder of said edge wall being tangently extended to provide for the required inserting and removing of lens-cells having the same diameter as the inner diameter of the semicircular portion of said edge wall, the tangently extended portion of said edge wall rigidly joining the corresponding portion of said protractor plate to said holder plate, and the semicircular portion of said edge wall rigidly joining the corresponding portion of said protractor plate to said holder plate.

17. Ophthalmic apparatus comprising a lens holder, a protractor plate member carried by said lens holder, a lens-cell embodying peripherial flanges spaced apart by a peripherial groove, support members carried by said protractor plate member, said support members adapted to engage in the groove of said lens-cell and support said lens-cell for rotation relative to the protractor.

18. Ophthalmic apparatus comprising a lens holder, a protractor plate member carried by said lens holder, a lens-cell embodying peripherial flanges spaced apart by a peripherial groove, support members carried by said protractor plate member, said support members adapted to engage in the groove of said lens-cell and support said lens-cell for rotation relative to the protractor, an index upon the inside of one of said flanges, and the other flange being indented to expose said index for cooperation with said protractor plate.

ORVAL W. LEE.